United States Patent
Haltiner, Jr. et al.

(10) Patent No.: US 7,326,482 B2
(45) Date of Patent: Feb. 5, 2008

(54) APPARATUS AND METHOD FOR OPERATION OF A HIGH TEMPERATURE FUEL CELL SYSTEM USING RECYCLED ANODE EXHAUST

(75) Inventors: Karl J. Haltiner, Jr., Fairport, NY (US); Malcolm J. Grieve, Fairport, NY (US); Kevin R. Keegan, Hilton, NY (US); David R. Schumann, Spencerport, NY (US)

(73) Assignee: Delphi Technologies, Inc., Troy, MI (US)

( * ) Notice: Subject to any disclaimer, the term of this patent is extended or adjusted under 35 U.S.C. 154(b) by 619 days.

(21) Appl. No.: 10/793,302

(22) Filed: Mar. 4, 2004

(65) Prior Publication Data

US 2005/0196653 A1    Sep. 8, 2005

(51) Int. Cl.
*H01M 8/00* (2006.01)
(52) U.S. Cl. .................. 429/17; 429/12; 429/13; 429/22
(58) Field of Classification Search ............... 429/30, 429/34, 38, 12, 13, 22, 24, 17
See application file for complete search history.

(56) References Cited

U.S. PATENT DOCUMENTS

| 4,522,894 | A | 6/1985 | Hwang et al. |
| 5,308,456 | A | 5/1994 | Kunz et al. |
| 2003/0113596 | A1 | 6/2003 | Huang et al. |
| 2004/0131912 | A1* | 7/2004 | Keefer et al. .................. 429/34 |

FOREIGN PATENT DOCUMENTS

| EP | 0 269 877 | 6/1988 |
| EP | 0 948 070 | 10/1999 |
| JP | 07 320765 | 12/1995 |
| JP | 09 180748 | 7/1997 |
| WO | 2004/064220 | 7/2004 |

OTHER PUBLICATIONS

European Search Report dated Jun. 27, 2005.

* cited by examiner

*Primary Examiner*—Patrick Joseph Ryan
*Assistant Examiner*—Monique Wills
(74) *Attorney, Agent, or Firm*—Paul L. Marshall

(57) ABSTRACT

A method for improving the efficiency of a hydrocarbon catalytic reformer and close-coupled fuel cell system by recycling a percentage of the anode exhaust syngas directly into the reformer in a range between about 20% and about 60%. Oxygen is supplied to the reformer at start-up. Under equilibrium conditions, oxygen required for reforming of hydrocarbon fuel is derived entirely from endothermic reforming of water and carbon dioxide in the recycled syngas. Recycling of anode syngas into the reformer increases fuel efficiency, adds excess water to the reformate to increase protection against anode coking, and protects the fuel cell stack against air- and water-borne contaminants. A method for producing an excess amount of syngas for exporting for other purposes is also provided.

13 Claims, 1 Drawing Sheet

APPARATUS AND METHOD FOR OPERATION OF A HIGH TEMPERATURE FUEL CELL SYSTEM USING RECYCLED ANODE EXHAUST

This invention was made with Government support under DE-FC26-02NT41246 awarded by DOE. The Government has certain rights in this invention.

TECHNICAL FIELD

The present invention relates to high temperature fuel cells having a solid-oxide electrolytic layer separating an anode layer from a cathode layer; more particularly, to high temperature fuel cell systems comprising a plurality of individual fuel cells in a stack wherein fuel is provided by an associated catalytic hydrocarbon reformer; and most particularly, to such a fuel cell system wherein steady-state reforming is substantially endothermic and wherein anode tail gas is recycled through the reformer to improve system efficiency.

BACKGROUND OF THE INVENTION

Fuel cells which generate electric current by controllably combining elemental hydrogen and oxygen are well known. In one form of such a fuel cell, an anodic layer and a cathodic layer are separated by a non-permeable electrolyte formed of a ceramic solid oxide. Such a fuel cell is known in the art as a "solid-oxide fuel cell" (SOFC). It is further known to combine a plurality of such fuel cells into a manifolded structure referred to in the art as a "fuel cell stack" and to provide a partially-oxidized "reformate" fuel to the stack from a hydrocarbon catalytic reformer.

Prior art catalytic partial-oxidizing (POX) reformers typically are operated exothermically by using intake air to partially oxidize hydrocarbon fuel as may be represented by the following equation for a hydrocarbon and air:

$$C_7H_{12}+3.5(O_2+3.77N_2) \rightarrow 6H_2+7CO+13.22N_2+\text{heat}. \quad \text{(Eq. 1)}$$

Prior art reformers typically are operated slightly fuel-lean of stoichiometric to prevent coking of the anodes from decomposition of non-reformed hydrocarbon within the fuel cell stack. Thus some full combustion of hydrocarbon and reformate occurs within the reformer in addition to, and in competition with, the electrochemical combustion of the fuel cell process. Such full combustion is wasteful of fuel and creates additional heat which must be removed from the reformate and/or stack, typically by passing a superabundance of cooling air through the cathode side of the stack.

It is known to produce a reformate containing hydrogen and carbon monoxide by endothermic steam reforming (SR) of hydrocarbon in the presence of water in the so-called "water gas" process, which may be represented by the following equation:

$$C_7H_{12}+7H_2O+\text{heat} \rightarrow 13H_2+7CO. \quad \text{(Eq. 2)}$$

Many known fuel cell systems use water in the reforming process, either recovered from the fuel cell exhaust or supplied to the system. In the case of recovered water, a large heat exchanger is required to condense the water, adding mass, cost, and parasitic losses to the system. In the case of supplied water, the water must be filtered and deionized, resulting in added cost, complexity, and maintenance requirements. In addition, for vehicular applications, the water must be stored, transported with the reformer, and periodically replenished.

It is also known to produce a reformate containing hydrogen and carbon monoxide by endothermic reforming of hydrocarbon in the presence of carbon dioxide in the so-called "dry reforming" process, which may be represented by the following equation:

$$C_7H_{12}+7CO_2+\text{heat} \rightarrow 6H_2+14CO. \quad \text{(Eq. 3)}$$

High temperature fuel cells inherently produce a combination of direct current electricity, waste heat, and syngas. The syngas, as used herein, is a mixture of unburned reformate, including hydrogen, carbon monoxide, and nitrogen, as well as combustion products such as carbon dioxide and water. In some prior art fuel cell systems, the syngas is burned in an afterburner, and the heat of combustion is partially recovered by heat exchange in heating incoming air for reforming or for the cathodes, or for both. In other prior art fuel cell systems, a portion of the anode syngas is recycled into the anode inlet to the fuel cell, in conjunction with fresh reformate, to improve the overall fuel efficiency of the fuel cell system.

What is needed in the art is a means for improving still further the fuel efficiency of a hydrocarbon reformer process.

What is also needed in the art is a means for improving the power density of a fuel cell stack.

BRIEF DESCRIPTION OF THE INVENTION

Briefly described, a method and apparatus for operating a hydrocarbon catalytic reformer and close-coupled fuel cell system in accordance with the invention comprises recycling a percentage of anode syngas into the reformer, preferably in a range between about 20% and 60%. Although air must be supplied to the reformer at start-up, after the system reaches equilibrium operating conditions, some or all of the oxygen required for reforming of hydrocarbon fuel may be derived by endothermically reforming water and carbon dioxide in the syngas. Efficiency is improved over similar prior art fuel cell systems because the water is kept and used in the gas phase, thus obviating the need for a condenser.

Recycling of anode syngas into the reformer a) increases fuel efficiency by endothermic reforming of water and carbon dioxide in the syngas in accordance with Equation 2 above; b) adds excess water to the reformate to increase protection against anode coking; and c) provides another opportunity for anode consumption of residual hydrogen and carbon monoxide in the syngas. In addition, this "recycle reformate" provides a more concentrated fuel supply to the stack since little or no air is added to the reformer. Air added to the reforming process adds significant amounts of nitrogen which dilutes the resulting reformate. The higher concentration of fuel gasses in "recycle reformate" increases the power output of the fuel cell stack.

BRIEF DESCRIPTION OF THE DRAWINGS

The present invention will now be described, by way of example, with reference to the accompanying drawing, in which.

DESCRIPTION OF THE PREFERRED EMBODIMENTS

Figure 1:
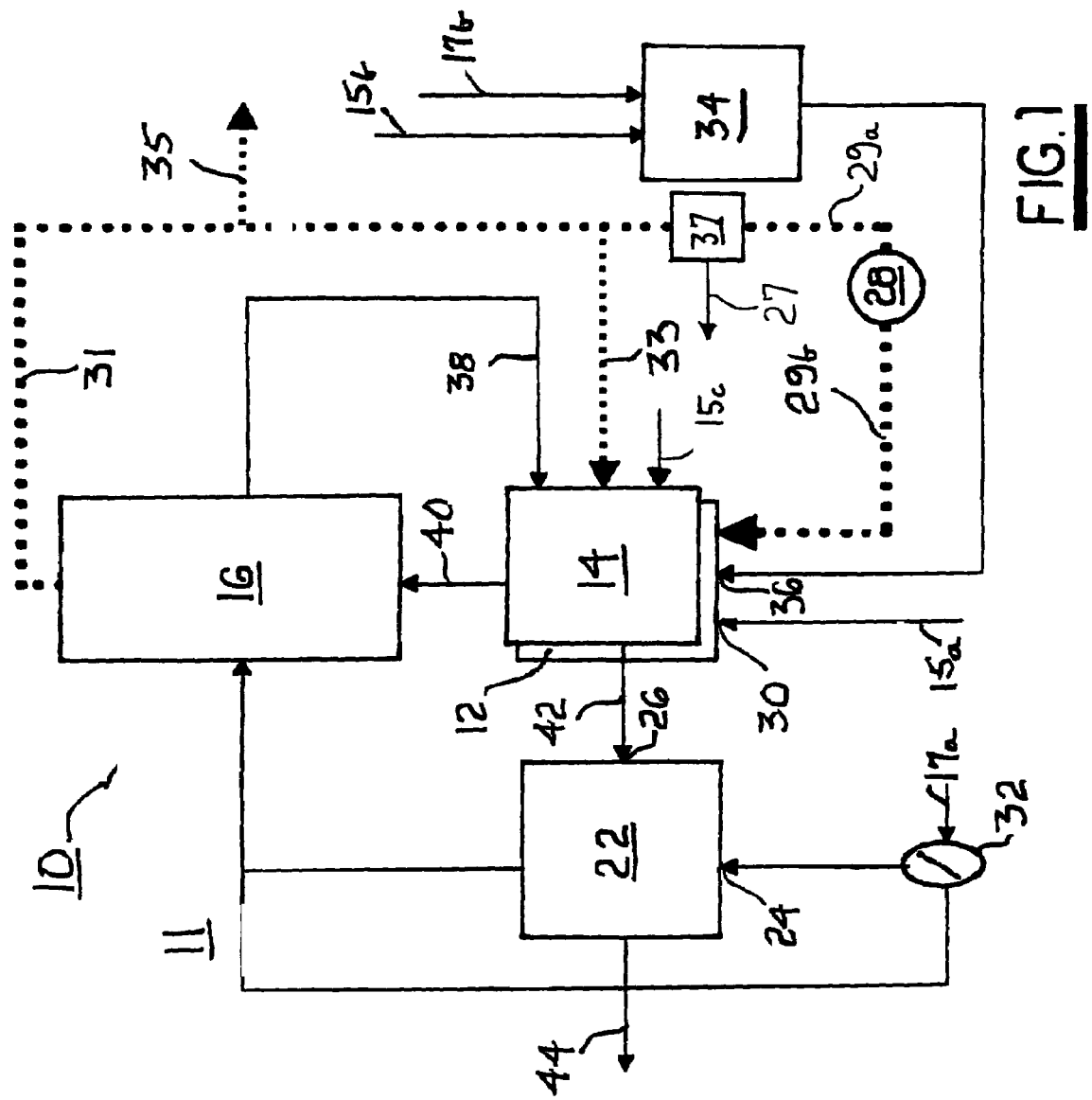
FIG. 1 is a schematic drawing of a high temperature fuel cell system in accordance with the invention.

Referring to FIG. 1, a high temperature fuel cell system 10 as may be suited to use as an auxiliary power unit (APU) in a vehicle 11 includes components known in the art of solid-oxide or molten carbonate fuel cell systems. FIG. 1 is not a comprehensive diagram of all components required for operation but includes only those components novelly formed and/or arranged in accordance with the apparatus and method of the invention. Missing components will be readily inferred by those of ordinary skill in the art.

A hydrocarbon catalytic reformer 12 includes a heat exchanger/combustor 14, preferably formed integrally therewith. A fuel cell stack 16 comprises preferably a plurality of individual fuel cell elements connected electrically in series as is known in the art. Stack 16 includes passageways for passage of reformate across the anode surfaces of the stack and passageways for passage of air across the cathode surfaces of the stack, as is well known in the prior art. A cathode air heat exchanger 22 includes an intake air side 24 and a combuster exhaust gas side 26. A pump 28 is provided for recycling a portion 29a, 29b of the anode tail gas 31, or syngas, into an inlet of reformer 12. Optionally, stream portion 29a may be cooled as it enters pump 28 by optional heat exchanger 37. The heat 27 absorbed from stream portion 29a can be used, as for example, for fuel vaporization, and for preheating of reformer inputs. An additional portion 33 of tail gas 31 may also be provided to exchanger/combustor 14, and the balance 35 may be exhausted or diverted to other purposes.

Endothermic reforming with syngas recycle may be represented by the following equation,

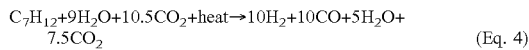

$$C_7H_{12}+9H_2O+10.5CO_2+\text{heat}\rightarrow 10H_2+10CO+5H_2O+7.5CO_2 \quad \text{(Eq. 4)}$$

Hydrogen and oxygen, combined to produce water in the electrochemical process of the fuel cell stack, are recovered by endothermic reforming and are used over again, thus greatly increasing the hydrocarbon fuel efficiency of the system. Further, the energy required for the water reforming is derived from the "waste" energy in the anode syngas which in prior art high temperature fuel cells is entirely discarded in the cathode cooling air and/or through the system exhaust.

In operation, fuel 15a is controllably supplied from a source (not shown) to an inlet 30 of reformer 12, as is known in the art. Fuel may comprise any conventional or alternative fuel as is known in the art, for example, gasoline, diesel, jet fuel, kerosene, propane, natural gas, carbon, biodiesel, ethanol and methanol. Air 17a is supplied from a source (not shown), such as a blower or other air pump, to intake air side 24 of heat exchanger 22 and thence to stack 16. A portion of air 17a may be diverted selectively around heat exchanger 22 by control valve 32 to control the temperature of the air entering the fuel cell stack.

At start-up, fuel 15b and air 17b are also supplied to a reformer pre-heater 34 connected to an inlet 36 on reformer 12. The air/fuel mixture in pre-heater 34 may be combusted therein, as by a spark igniter, or alternatively may be reformed therein upon an electrically-heated catalyst, to provide a hot exhaust for rapid warming of catalytic elements in reformer 12 to provide a rapid start-up of system 10. At a time after start-up when such heating is no longer needed, the air flow and fuel flow to pre-heater 34 may be terminated.

Reformate 40 is supplied from reformer 12 to anodes in stack 16. Syngas 31 (anode tail gas) is exhausted from stack 16 and is preferably assisted by inline pump 28. First portion 29 of the exhausted syngas is recycled to an inlet of reformer 12; preferably, recycled portion 29 is between about 20% and about 60% of total syngas flow 31. Second portion 33 of the exhausted syngas is recycled to an inlet of heat exchanger/combustor 14. Heated cathode air 38 is exhausted from stack 16 and is provided to heat exchanger/combustor 14 wherein it is mixed with syngas portion 33 and combusted to provide heat for endothermic reforming of water and carbon dioxide with hydrocarbon fuel in reformer 12. Spent air and combustion products 42 are exhausted from heat exchanger/combustor 14 and passed through exhaust side 26 of heat exchanger 22 wherein heat is abstracted by intake air 17a in inlet side 24. Cooled exhaust is discharged to atmosphere 44.

Optionally, additional fuel 15c may be controllably supplied to reformer 12 from a source (not shown) so that a greater portion of tailgas 31 may be exported for other purposes through exhaust 35.

Under these or similar steady-state operating conditions, little or no outside air need be provided to reformer 12. Sufficient heat is provided to the reformer from the sensible heat of the recycled tail gas plus combustion of syngas portion 33 to permit endothermic reforming of the input fuel and the water and carbon dioxide in the syngas. Most or all of the needed reforming oxygen is derived from the water and carbon dioxide.

The following benefits accrue to a fuel cell system in accordance with the invention:

1. The net fuel/electric efficiency of the system may be substantially increased over prior art high temperature fuel cell systems. Most of the system efficiency improvement is from higher reforming efficiency. Some of the improvement is from higher effective stack fuel utilization.

2. The power density of the stack is increased by increasing the concentration of reactants in the stack and by minimizing concentration polarization by less nitrogen dilution.

3. The system is allowed to operate with a higher margin of safety in terms of carbon formation in the reformer, reformate piping, or stack inlet.

4. The admission of water-borne contaminants on the fuel cell anodes is avoided or eliminated altogether, by eliminating the need for exogenous water and exogenous oxygen. All fuel cells tend to have sensitivities to trace contaminants which come into the system over time in the air, fuel, and/or water consumed in operation. The level of sensitivity depends in part upon the fuel cell technology and the operating temperature. While solid oxide fuel cells tend to have less sensitivity to contaminants than some other types, the accumulation of sulfur, metal oxides, salts, carbon, and other contaminants can lead to long term loss in performance. In endothermic reforming in accordance with the invention, the combustion water and oxygen are chemically pure, resulting from generation within the fuel cell system itself.

Using recycled anode exhaust as the steady-state oxidant for the system allows a near fully endothermic (using only recycle) reforming process. Depending upon the selected operating temperature for the stack and reformer, the efficiency of heat recovery in the final exhaust and the minimization of thermal losses to the walls, there may not always be a balance between heat required to preheat the reactants and do the endothermic chemistry with heat available through simple heat exchange from the cathode exhaust. Therefore, a portion of the anode exhaust which is not recycled into the reformer may be used as shown to supply combustive heat to the reformer to support the endothermic reforming process.

Reformate is a highly useful fuel which in itself can be exported for use on other apparatus, for combustion and/or exhaust after-treatment functions. It is possible to operate the reformer to produce excess reformate for these additional uses. To further improve the fuel cell system efficiency, the exported reformate may be taken from downstream of the stack, with reduced fuel utilization in the stack resulting in improved stack efficiency. If this export periodically is not necessary (e.g., vehicle engine or other reformate consumer is off) then the reformate volume can be reduced to just the amount required by the fuel cell stack with higher utilization.

While the invention has been described by reference to specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell system for generating electricity by combination of oxygen with hydrogen-containing fuel, comprising:
   a) a fuel cell stack including cathodes and anodes;
   b) a catalytic reformer for reforming hydrocarbon to provide hydrogen-containing reformate fuel to said stack, and
   c) a combuster,
   wherein said stack exhausts syngas and cathode air, and
   wherein said system is configured to recycle a first portion of said exhausted syngas into said reformer, said first portion being about 20% to about 60% of said syngas exhausted from said stack, and
   wherein said system is configured to recycle said cathode air and a second portion of said exhausted syngas into said combustor so that said second portion of said exhausted syngas and said cathode air are combusted to provide heat for reforming hydrocarbon in said catalytic reformer.

2. A fuel cell system in accordance with claim 1 further including a syngas outlet through which produced syngas may be exported for other purposes.

3. A fuel cell system in accordance with claim 2 further including a controllable hydrocarbon fuel supply to the reformer for controlling the export of produced syngas.

4. A fuel cell system in accordance with claim 1 further including an inline pump for recycling said syngas into said reformer.

5. A fuel system in accordance with claim 4 further including a heat exchanger for cooling said syngas entering said pump.

6. A fuel system in accordance with claim 5 further configured to supply heat removed from said syngas for heating reformer input.

7. A fuel cell system in accordance with claim 1 wherein reforming in said reformer includes endothermic reforming of hydrocarbons in combination with water and carbon dioxide.

8. A fuel cell system in accordance with claim 1 wherein said fuel cells are selected from the group consisting of solid-oxide fuel cells and molten carbonate fuel cells.

9. A vehicle comprising a fuel cell system wherein said fuel cell system includes
   a fuel cell stack including cathodes and anodes,
   a catalytic reformer for reforming hydrocarbon to provide hydrogen-containing reformate fuel to said stack, and
   a combustor,
   wherein said stack exhausts syngas and cathode air, and
   wherein said system is configured to recycle a first portion of said exhausted syngas into said reformer, said first portion being about 20% to about 60% of said syngas exhausted from said stack, and
   wherein said system is configured to recycle said cathode air and a second portion of said exhausted syngas into said combustor so that said second portion of said exhausted syngas and said cathode air are combusted to provide heat for reforming hydrocarbon in said catalytic reformer.

10. A method for operating a high temperature fuel cell system including a fuel cell stack including cathodes and anodes, a catalytic reformer for reforming hydrocarbon to provide hydrogen-containing reformate fuel to said stack, and a combustor, comprising the steps of:
    a) directing said reformate fuel into said stack assembly;
    b) exhausting a massflow of syngas from said stack;
    c) exhausting cathode air from said stack;
    d) recycling a first portion of said syngas massflow into said reformer, wherein said first portion is from about 20% to about 60% of said exhausting syngas massflow;
    e) recycling a second portion of said syngas massflow into said combustor;
    f) providing said exhausted cathode air into said combustor; and
    g) combusting said second portion of said syngas massflow and said exhausted cathode air in said combustor to provide heat for reforming hydrocarbon in said catalytic reformer.

11. A method in accordance with claim 10 further comprising the step of exporting an amount of said syngas massflow for other purposes.

12. A method in accordance with claim 11 further comprising the step of providing a controllable hydrocarbon fuel supply to the reformer for controlling the amount of syngas massflow available for export.

13. A method in accordance with claim 10 wherein said recycled syngas portion includes water and carbon dioxide, further comprising the step of endothermically reforming said water, said carbon dioxide, and said hydrocarbon in said reformer into hydrogen and carbon monoxide in said reformate fuel.

* * * * *